(12) United States Patent
Sheridan

(10) Patent No.: US 9,732,839 B2
(45) Date of Patent: Aug. 15, 2017

(54) FAN DRIVE GEAR SYSTEM INTEGRATED CARRIER AND TORQUE FRAME

(71) Applicant: United Technologies Corporation, Hartford, CT (US)

(72) Inventor: William G. Sheridan, Southington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 492 days.

(21) Appl. No.: 14/484,673

(22) Filed: Sep. 12, 2014

(65) Prior Publication Data

US 2015/0323056 A1 Nov. 12, 2015

Related U.S. Application Data

(63) Continuation of application No. 13/095,324, filed on Apr. 27, 2011, now Pat. No. 8,900,083.

(51) Int. Cl.
| | |
|---|---|
| *F16H 57/04* | (2010.01) |
| *F16H 1/28* | (2006.01) |
| *F02C 7/36* | (2006.01) |
| *F02K 3/06* | (2006.01) |

(52) U.S. Cl.
CPC ........... *F16H 57/0424* (2013.01); *F02C 7/36* (2013.01); *F02K 3/06* (2013.01); *F16H 1/28* (2013.01); *F16H 57/046* (2013.01); *F16H 57/0471* (2013.01); *F05D 2260/40311* (2013.01); *Y02T 50/672* (2013.01); *Y10T 29/49465* (2015.01); *Y10T 29/49682* (2015.01); *Y10T 74/19642* (2015.01); *Y10T 74/19991* (2015.01)

(58) Field of Classification Search
None
See application file for complete search history.

(56) References Cited

U.S. PATENT DOCUMENTS

| | | |
|---|---|---|
| 2,281,875 A | 5/1942 | Gleissner |
| 2,749,778 A | 6/1956 | Kuhn |
| 3,227,006 A | 1/1966 | Bowen, Jr. |
| 3,257,869 A | 6/1966 | Sharples |
| 3,352,178 A | 11/1967 | Lindgren et al. |
| 3,635,103 A | 1/1972 | Monti |

(Continued)

OTHER PUBLICATIONS

Vibration Monitoring of UH-60A Main Transmission Planetary Carrier Fault by Jonathan A. Keller and Paul Grabill presented at the American Helicopter Society 59th Annual Forum, Phoenix, Arizona, May 6-8, 2003, Copyright 2003 by the American Helicopter Society International, Inc. (11 pages).

*Primary Examiner* — Justin Holmes
(74) *Attorney, Agent, or Firm* — Carlson, Gaskey & Olds, P.C.

(57) ABSTRACT

A method of assembling a fan drive gear system includes the steps of installing spherical bearings into respective races to provide a plurality of bearing assemblies, mounting at least one of the bearing assemblies onto a corresponding shaft of a torque frame, each of the shafts fixed relative to one another, installing at least one gear onto at least one of the bearing assemblies, the gears meshing with a ring gear and a centrally located sun gear and grounding the torque frame to a static structure to prevent rotation of the torque frame.

18 Claims, 4 Drawing Sheets

(56) References Cited

U.S. PATENT DOCUMENTS

| | | | |
|---|---|---|---|
| 5,102,379 | A | 4/1992 | Pagluica et al. |
| 5,391,125 | A | 2/1995 | Turra et al. |
| 5,433,674 | A | 7/1995 | Sheridan et al. |
| 5,466,198 | A | 11/1995 | McKibbin et al. |
| 6,223,616 | B1 | 5/2001 | Sheridan |
| 6,663,530 | B2 | 12/2003 | Poulin et al. |
| 7,033,301 | B2 | 4/2006 | Kimes |
| 7,220,057 | B2 | 5/2007 | Hoppe |
| 7,223,197 | B2 | 5/2007 | Poulin et al. |
| 7,704,178 | B2 | 4/2010 | Sheridan et al. |
| 7,883,439 | B2 | 2/2011 | Sheridan et al. |
| 8,075,443 | B2 * | 12/2011 | Cunliffe ............ F16H 1/2836 475/345 |
| 8,585,538 | B2 | 11/2013 | Sheridan et al. |
| 8,813,469 | B2 | 8/2014 | Sheridan |
| 2010/0105516 | A1 | 4/2010 | Sheridan et al. |
| 2010/0154217 | A1 | 6/2010 | Sheridan et al. |
| 2010/0247015 | A1 | 9/2010 | Montagu et al. |
| 2012/0277055 | A1 | 11/2012 | Sheridan |
| 2015/0377143 | A1 * | 12/2015 | Sheridan ............... F02C 7/36 415/124.1 |

* cited by examiner

FAN DRIVE GEAR SYSTEM INTEGRATED CARRIER AND TORQUE FRAME

CROSS-REFERENCE TO RELATED APPLICATIONS

This disclosure is a continuation of U.S. patent application Ser. No. 13/095,324 filed Apr. 27, 2011.

BACKGROUND

This disclosure relates to a fan drive gear system integrated carrier and torque frame.

One type of gas turbine engine includes a fan drive gear system that is mechanically arranged between the turbo-machinery of the engine and a fan. The turbo-machinery is composed of two concentric shafts rotating at different speeds containing independent compressors and turbines. The turbo-machinery rotationally drives the fan, via the gear system, to move fluid through a nacelle which divides the fluid flow into two streams. An inner stream supplies the turbo-machinery and the outer stream consists of fluid which bypasses the inner stream and is solely compressed and moved by the fan.

Typically the fan drive gear system is provided by an epicyclic gear train and includes a centrally located input gear driven by the turbo-machinery, intermediate gears circumferentially arranged about and intermeshing with the input gear and a ring gear provided about and intermeshing the intermediate gears. Depending upon the configuration, either the intermediate gears or the ring gear rotationally drives the fan in response to rotation of the input gear.

The intermediate gears are typically supported in a carrier by a journal extending between spaced apart walls of the carrier. The carrier is typically constructed from a high strength metallic alloy such as steel, titanium or nickel. The carrier is bolted to a torque frame, which is secured to fixed structure or rotating structure depending upon the particular type of gear system.

One type of gear system for helicopter applications has been used which directly supports the intermediate gears on an integrated carrier and torque frame. This integrated torque frame includes shafts that directly support the intermediate gears in a cantilevered fashion by conventional rolling element bearings. This arrangement is subjected to vibrational stresses that may cause the integrated torque frame to fail.

SUMMARY

In one exemplary embodiment, a method of assembling a fan drive gear system includes the steps of installing spherical bearings into respective races to provide a plurality of bearing assemblies, mounting at least one of the bearing assemblies onto a corresponding shaft of a torque frame, each of the shafts fixed relative to one another, installing at least one gear onto at least one of the bearing assemblies, the gears meshing with a ring gear and a centrally located sun gear and grounding the torque frame to a static structure to prevent rotation of the torque frame.

In a further embodiment of the above, the installing spherical bearings step includes inserting a spherical bearing into slots in the race and rotating the spherical bearing and the race relative to one another to seat the spherical bearing within the race.

In a further embodiment of any of the above, the installing spherical bearings step includes aligning first and second lubrication passageways provided in the spherical bearing and race with one another.

In a further embodiment of any of the above, the installing spherical bearings step includes locating a pin within a notch and the mounting step includes securing a fastening element to the shaft to retain the at least one bearing assembly on the torque frame.

In a further embodiment of any of the above, the method includes the step of engaging the torque frame to a first structure and engaging the sun gear to a second structure. The installing step includes installing intermediate gears around the sun gear.

In a further embodiment of any of the above, the method includes the step of engaging an oil baffle to the torque frame and fluidly connecting lubrication passages in the torque frame to lubrication passageways in the oil baffle.

In a further embodiment of any of the above, the lubrication passageways include a spray bar facing the sun gear.

In another exemplary embodiment, a fan drive gear lubrication system includes a torque frame that supports multiple gears and includes at least one torque frame lubrication passage. An oil baffle engages the torque frame and includes a central opening and multiple circumferentially spaced gear pockets arranged about the central opening and receiving the multiple gears. The oil baffle includes at least one oil baffle lubrication passageway that is in fluid communication with the torque frame lubrication passage. The torque frame includes a base with integrated gear shafts circumferentially spaced relative to one another and supporting the multiple gears. A bearing assembly is mounted on each gear shaft and includes a race receiving a spherical bearing and at least one bearing passageway that extends through each of the spherical bearings and the race. At least one bearing passageway is in fluid communication with the torque frame lubrication passage. A gear is supported for rotation about a bearing axis provided by the race. The gear is configured to slidingly rotate on and about the race.

In a further embodiment of any of the above, at least one oil baffle lubrication passageway includes a spray bar that is configured to direct lubricating fluid at teeth of a gear.

In a further embodiment of any of the above, the torque frame is constructed from a high strength metallic alloy and the oil baffle is constructed from a lower strength, lighter weight alloy than the high strength metallic alloy.

In another exemplary embodiment, a method of designing a fan drive gear system includes the steps of defining spherical bearings to be installed into corresponding races to provide a plurality of bearing assemblies, defining at least one of the bearing assemblies to be mounted onto a respective shaft of a torque frame, each of the shafts defined to be fixed relative to one another, defining at least one gear to be installed onto a corresponding bearing assembly, the gears defined to mesh with a ring gear and a centrally located sun gear and defining the torque frame to be grounded to a static structure to prevent rotation of the torque frame.

In a further embodiment of the above, the spherical bearing defining step includes defining a spherical bearing to be inserted into slots in the race and the spherical bearing and the race defined to be rotated relative to one another to seat the spherical bearing within the race.

In a further embodiment of any of the above, the spherical bearing defining step includes aligning first and second lubrication passageways provided in the spherical bearing and race with one another.

In a further embodiment of any of the above, the spherical bearing defining step includes locating a pin within a notch. The bearing assembly defining step includes defining a fastening element to be secured to the shaft to retain at least one bearing assembly on the torque frame.

In a further embodiment of any of the above, the method includes the step of defining the torque frame to engage a first structure and defining the sun gear to engage a second structure. The gear defining step includes defining intermediate gears around the sun gear.

In a further embodiment of any of the above, the method includes the step of defining an oil baffle to engage the torque frame and fluidly connecting lubrication passages in the torque frame to lubrication passageways in the oil baffle.

In a further embodiment of any of the above, the lubrication passageways include a spray bar facing the sun gear.

In a further embodiment of any of the above, the torque frame is defined to be constructed from a high strength metallic alloy, and the oil baffle is defined to be constructed from a lower strength lighter weight alloy than the high strength metallic alloy.

BRIEF DESCRIPTION OF THE DRAWINGS

The disclosure can be further understood by reference to the following detailed description when considered in connection with the accompanying drawings wherein.

DETAILED DESCRIPTION

Figure 1:
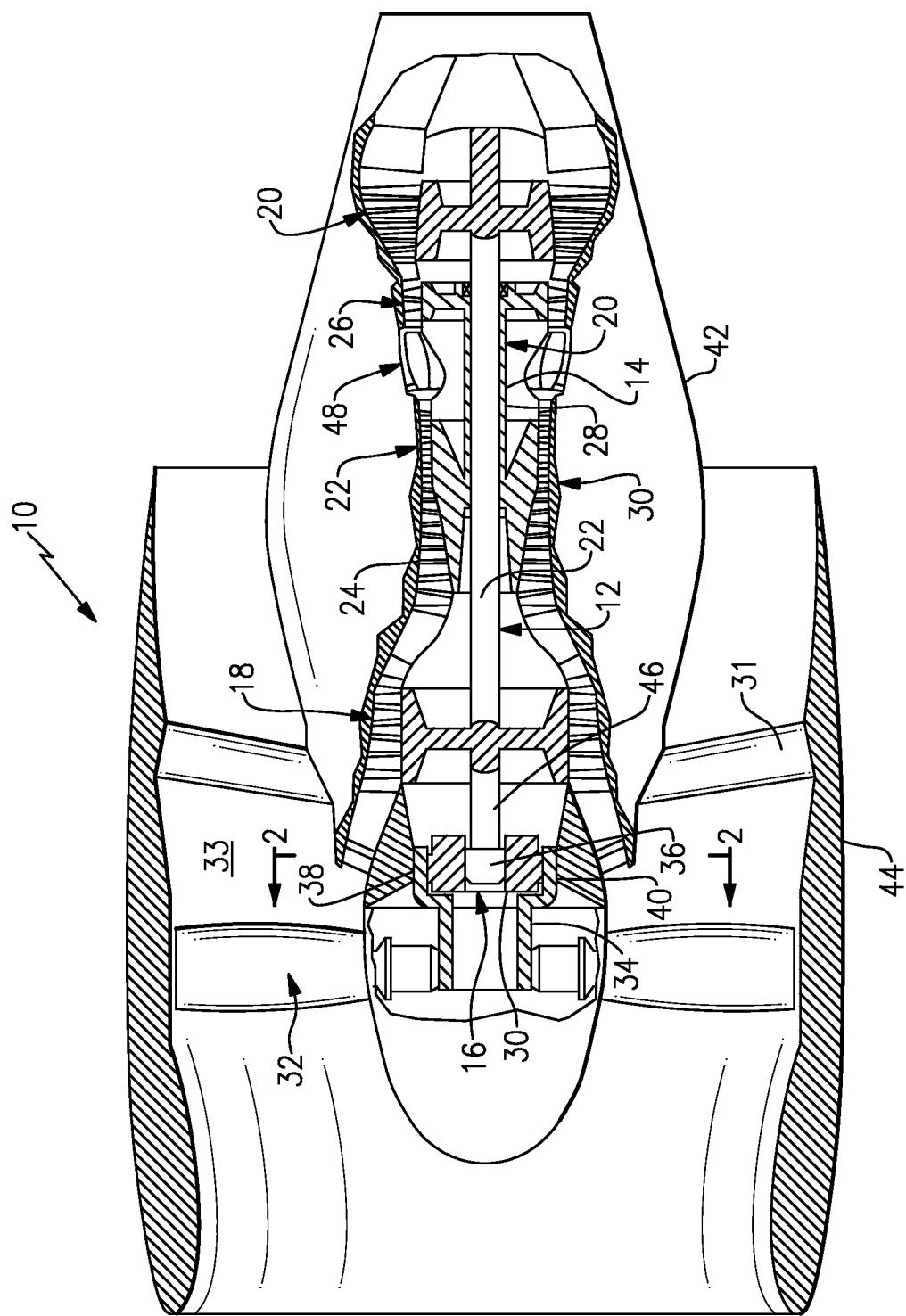
FIG. 1 is a schematic cross-sectional view of an example gas turbine engine.

An example gas turbine engine 10 is schematically illustrated in FIG. 1. The engine 10 includes turbo-machinery 30 having a compressor section 12 and a turbine section 14. The turbo-machinery 30 rotationally drives a fan 32, that is arranged in a bypass flow path 33, through an epicyclic gear train 16. The turbo-machinery 30 is housed within an inner nacelle 42. Flow exit guide vanes 31 arranged within the bypass flow path support the turbo-machinery 30 relative to a fan case, which is housed in a fan nacelle 44.

A low pressure compressor 18 and a low pressure turbine 20 are mounted on a low pressure spool 22. A high pressure compressor 24 and a high pressure turbine 26 are mounted on a high pressure spool 28. A combustor section 48 is arranged between the high pressure compressor 24 and the high pressure turbine 26.

The low pressure spool 22 rotationally drives a flex shaft 46 to which an input gear 36 (sun gear) is mounted for rotation about an axis A. Intermediate gears 38 (in the example, star gears) are arranged circumferentially about and intermesh with the input gear 36. A ring gear 40 surrounds and intermeshes with the intermediate gears 38. Either the intermediate gears 38 or the ring gear 40 rotationally drives the fan shaft 34 depending upon the type of epicyclic gear train configuration.

Figure 2:
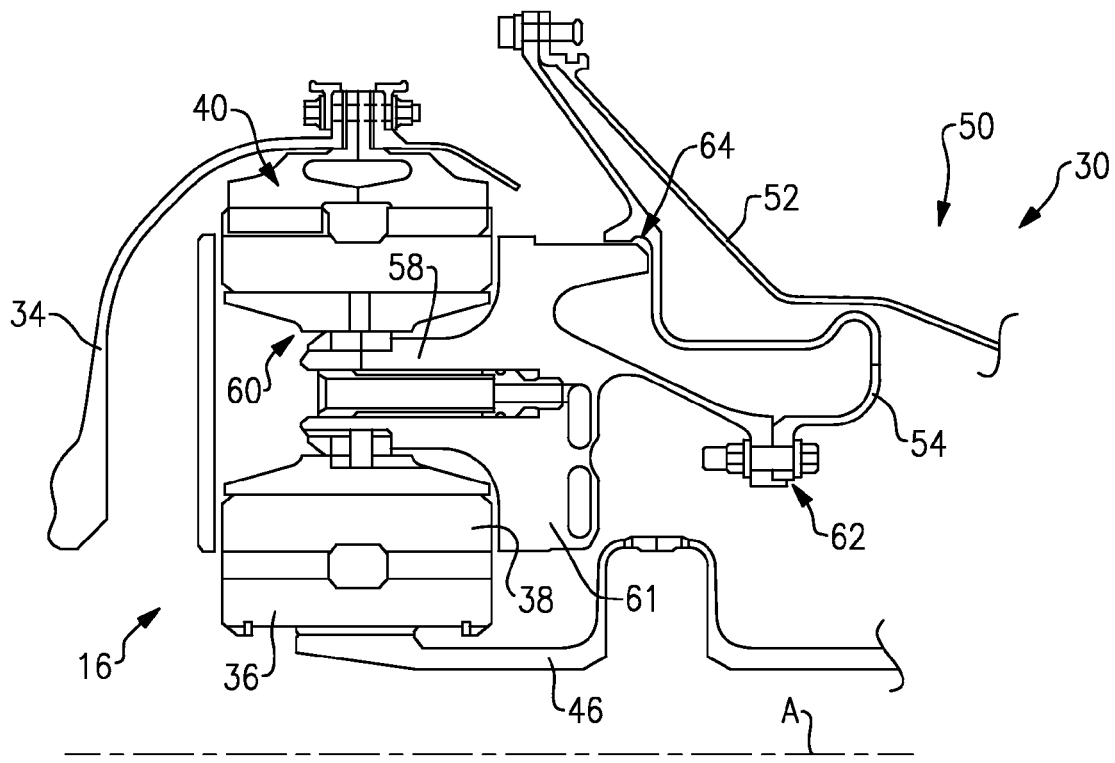
FIG. 2 is a cross-sectional view of an example fan drive gear system.
Figure 2:
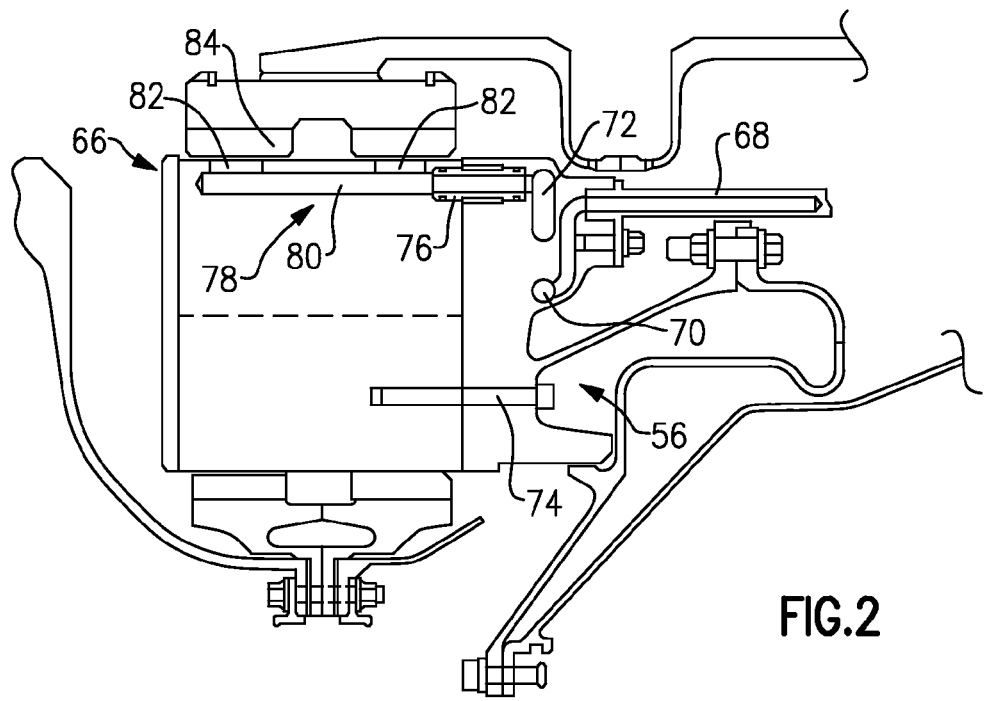

One example epicyclic gear train 16 is illustrated in FIG. 2. The epicyclic gear train 16 is the type in which the intermediate gears 38 (star gears, in the example) are rotationally fixed relative to the rotational axis of the input gear 36. That is, the star gears are permitted to rotate about their respective rotational axes but do not rotate about the rotational axis of the input gear 36. The ring gear 40 is coupled to the fan shaft 34 and to rotationally drive the fan 32. The turbo-machinery 30 includes fixed structure 50 comprising a bearing compartment case 52 and a support member 54. A torque frame 56 is affixed to the support member 54 to prevent rotation of the torque frame 56 about the rotational axis A of the input gear 36. However, it should be understood that in a planetary gear configuration the torque frame 56 would rotate about the rotational axis A and the ring gear would be coupled to fixed structure.

The torque frame 56 includes multiple shafts 58 integral with a base 61 that provides first and second support features 62, 64 affixed to the support member 54. In the example, the torque frame 56 includes five equally circumferentially spaced shafts 58 that correspondingly support five star gears. The base 61 and shafts 58 of the torque frame 56 are unitary and formed by a one-piece structure, for example, by a cast steel structure. Other high strength metallic alloys, such titanium or nickel, may also be used.

Each shaft 58 includes a bearing assembly 60 for rotationally supporting its respective intermediate gear 38. An oil baffle 66 is secured to the torque frame 56 by fasteners 74. The oil baffle 66 is non-structural. That is, the oil baffle does not support the loads of the intermediate gears 38 as would a prior art carrier. As a result, the oil baffle 66 may be constructed from a considerably lower strength lighter weight material, such as an aluminum alloy or composite material.

Both the torque frame 56 and the oil baffle 66 provide internal lubrication features for supplying lubricating fluid, such as oil, to the gears of the epicyclic gear train 16. As an example, a feed tube 68 supplies oil to first and second passages 70, 72 provided in the torque frame 56. A tube 76 fluidly interconnects the second passage 72 to a spray bar 78 provided integrally in the oil baffle 66. The spray bar 78 includes a first passageway 80, which extends in a generally axial direction in the example shown, and one or more second passageways 82 transverse to the first passageway 80. In the example, a pair of second passageways 82 are oriented to direct lubrication fluid radially inward at teeth 84 of the input gear 36.

Figure 3:
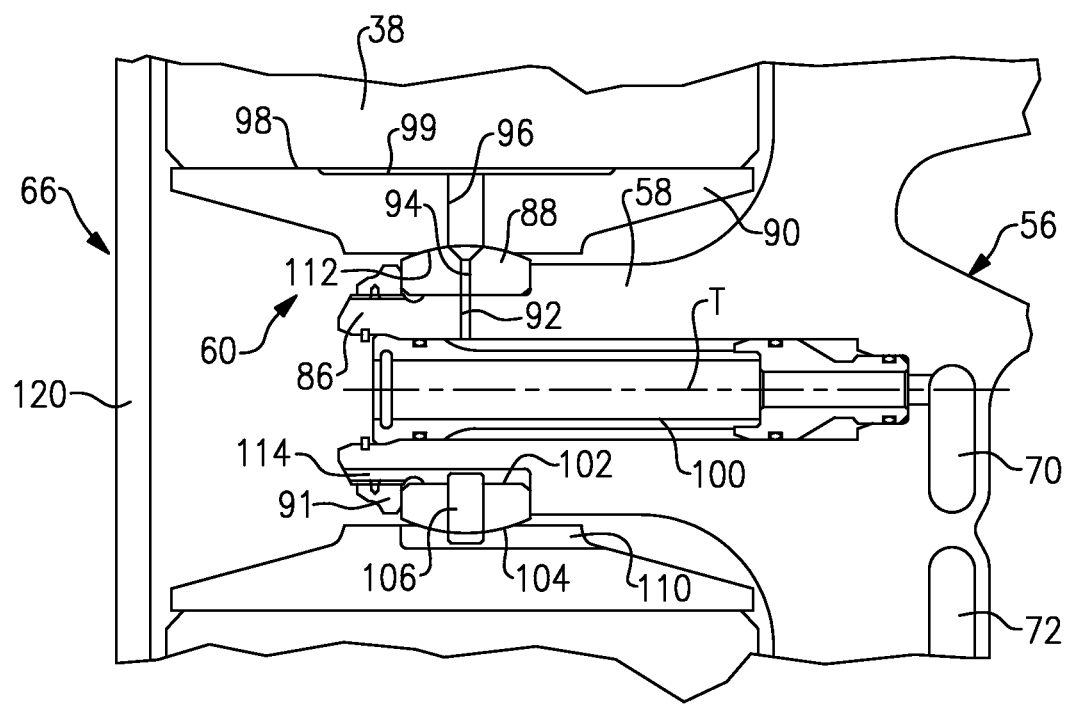
FIG. 3 is an enlarged cross-sectional view of a portion of the fan drive gear system illustrated in FIG. 2.

Referring to FIG. 3, each shaft 58 includes an end 86 that supports a bearing assembly 60. The bearing assembly 60 includes a spherical bearing 88 supported in a race 90 on which the intermediate gear 38 is mounted. The ends 86 include a threaded portion that each receives a nut 91 securing the bearing assembly 60 to the shaft 58. The shaft 58, spherical bearing 88 and race 90 respectively include radially extending first, second and third passageways 92, 94, 96 that are aligned with one another to deliver lubricating fluid from the first passage 70 to bearing surfaces 98 provided between the race 90 and the intermediate gear 38. A recess 99 is provided in an outer diameter of the race 90 to increase lubrication at the bearing surfaces 98. In one example, a filter 100 is arranged in a hole in the shaft 58 that provides a portion of the first passage 70.

Figure 5A:
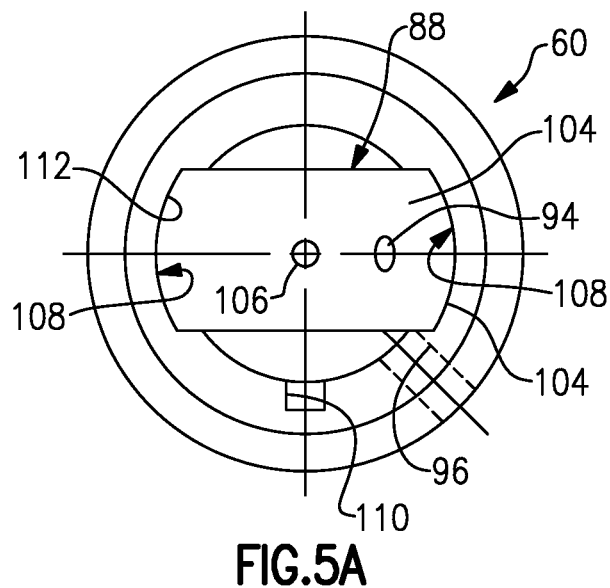
FIG. 5A is an elevational view of the spherical bearing of FIG. 4 inserted into a race in an assembly position.
Figure 5B:
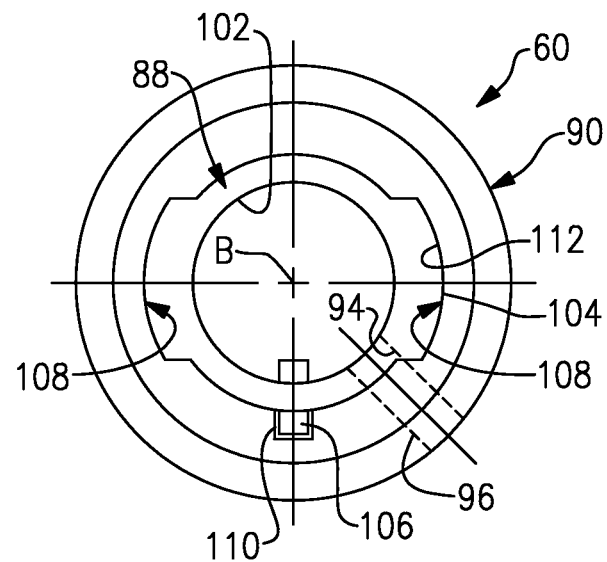
FIG. 5B is an elevational view of the spherical bearing of FIG. 4 fully assembled into the race to provide a bearing assembly.
Figure 4:
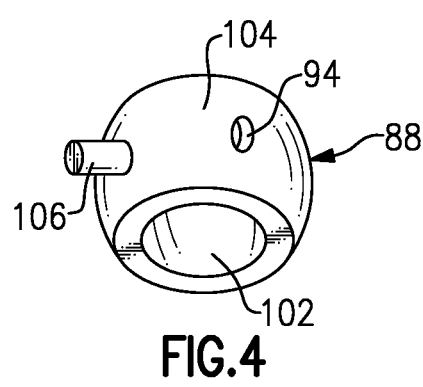
FIG. 4 is a perspective view of an example spherical bearing.

Referring to FIGS. 3-5B, the spherical bearing 88 includes an inner diameter 102 that is supported by the end 86. A convex surface 104 is provided on an outside of the spherical bearing 88 and mates with a corresponding concave surface 112 provided by an inner surface of the race 90 when fully assembled as illustrated in FIG. 5B. The spherical bearing 88 includes a pin 106 that extends through both the inner diameter 102 and the convex surface 104 in the example illustrated. The pin 106 is received by notches 110, 114 respectively provided in the race 90 and end 86 to prevent rotation of the spherical bearing 88 about a bearing axis B (FIG. 5B). The spherical bearing 88 permits angular movement of the bearing axis B relative to a shaft axis T (FIG. 3) provided by the shaft 58 during flexing of the shafts 58, which provides a near zero moment restraint.

FIGS. 5A and 5B illustrate the assembly process of the bearing assembly 60. The spherical bearing 88 is inserted into slots 108 of the race 90, as shown in FIG. 5A. The pin 106 is aligned with the notch 110 and the spherical bearing 88 is rotated to snap into engagement with the concave surface 112 with the pin 106 received in the notch 110. In this position, illustrated in FIG. 5B, the second and third passageways 94, 96 are aligned with one another.

Figure 6:
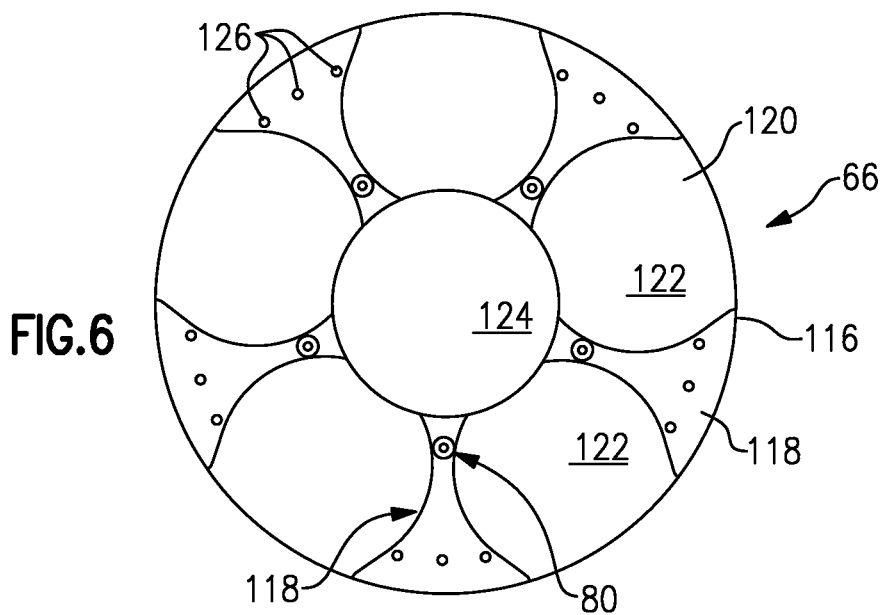
FIG. 6 is an elevational view of an example oil baffle used in the fan drive gear system and illustrated in FIGS. 2 and 3.

The oil baffle 66 is illustrated in more detail in FIG. 6. The oil baffle 66 is provided by a body 116 having circumferentially spaced apart intermediate structures 118 axially extending from a wall 120. The intermediate structures 118 define gear pockets 122 within which the intermediate gears 38 are received with the epicyclic gear train 16 fully assembled. The input gear 36 was received in a central opening 124 provided radially inward of the intermediate structures 118. Holes 126 are provided in the intermediate structures 118 and receive the fasteners 74 to secure the oil baffle 66 to the torque frame 56, as illustrated in FIG. 2.

Although an example embodiment has been disclosed, a worker of ordinary skill in this art would recognize that certain modifications would come within the scope of the claims. For that reason, the following claims should be studied to determine their true scope and content.

What is claimed is:

1. A method of assembling a fan drive gear system comprising the steps of:
    installing spherical bearings into respective races to provide a plurality of bearing assemblies;
    mounting at least one of the bearing assemblies onto a corresponding shaft of a torque frame, each of the shafts fixed relative to one another;
    installing at least one gear onto at least one of the bearing assemblies, the gears meshing with a ring gear and a centrally located sun gear; and
    grounding the torque frame to a static structure to prevent rotation of the torque frame.

2. The method according to claim 1, wherein the installing spherical bearings step includes inserting a spherical bearing into slots in the race and rotating the spherical bearing and the race relative to one another to seat the spherical bearing within the race.

3. The method according to claim 2, wherein the installing spherical bearings step includes aligning first and second lubrication passageways provided in the spherical bearing and race with one another.

4. The method according to claim 2, wherein the installing spherical bearings step includes locating a pin within a notch, and the mounting step includes securing a fastening element to the shaft to retain the at least one bearing assembly on the torque frame.

5. The method according to claim 1, comprising the step of engaging the torque frame to a first structure and engaging the sun gear to a second structure, and the installing steps includes installing intermediate gears around the sun gear, wherein the intermediate gears include the at least one gear.

6. The method according to claim 1, comprising the step of engaging an oil baffle to the torque frame and fluidly connecting lubrication passages in the torque frame to lubrication passageways in the oil baffle.

7. The method according to claim 6, wherein the lubrication passageways include a spray bar facing the sun gear.

8. A fan drive gear lubrication system comprising:
    a torque frame supporting multiple gears and including at least one torque frame lubrication passage;
    an oil baffle engaging the torque frame and including a central opening and multiple circumferentially spaced gear pockets arranged about the central opening and receiving the multiple gears, the oil baffle including at least one oil baffle lubrication passageway in fluid communication with the torque frame lubrication passage, wherein the torque frame includes a base with integrated gear shafts circumferentially spaced relative to one another and supporting the multiple gears;
    wherein a bearing assembly is mounted on each gear shaft and includes:
        a race receiving a spherical bearing, and
        at least one bearing passageway extending through each of the spherical bearings and the race, the at least one bearing passageway in fluid communication with the torque frame lubrication passage; and
    wherein each of the multiple gears are supported for rotation about a bearing axis provided by its respective race, each of the multiple gears are configured to slidingly rotate on and about it respective race.

9. The system according to claim 8, wherein the at least one oil baffle lubrication passageway includes a spray bar configured to direct lubricating fluid at teeth of a gear.

10. The system according to claim 8, wherein the torque frame is constructed from a high strength metallic alloy, and the oil baffle is constructed from a lower strength, lighter weight alloy than the high strength metallic alloy.

11. A method of designing a fan drive gear system comprising the steps of:
    defining spherical bearings to be installed into corresponding races to provide a plurality of bearing assemblies;
    defining at least one of the bearing assemblies to be mounted onto a respective shaft of a torque frame, each of the shafts defined to be fixed relative to one another;
    defining at least one gear to be installed onto a corresponding bearing assembly, the gears defined to mesh with a ring gear and a centrally located sun gear; and
    defining the torque frame to be grounded to a static structure to prevent rotation of the torque frame.

12. The method according to claim 11, wherein the spherical bearing defining step includes defining a spherical bearing to be inserted into slots in the race and the spherical bearing and the race defined to be rotated relative to one another to seat the spherical bearing within the race.

13. The method according to claim 12, wherein the spherical bearing defining step includes aligning first and second lubrication passageways provided in the spherical bearing and race with one another.

14. The method according to claim 12, wherein the spherical bearing defining step includes locating a pin within a notch, and wherein the bearing assembly defining step includes defining a fastening element to be secured to the shaft to retain the at least one bearing assembly on the torque frame.

15. The method according to claim 11, comprising the step of defining the torque frame to engage a first structure and defining the sun gear to engage a second structure, and the gear defining step includes defining intermediate gears around the sun gear, wherein the intermediate gears include the at least one gear.

16. The method according to claim 11, comprising the step of defining an oil baffle to engage the torque frame and fluidly connecting lubrication passages in the torque frame to lubrication passageways in the oil baffle.

17. The method according to claim 16, wherein the lubrication passageways include a spray bar facing the sun gear.

18. The method according to claim 16, wherein the torque frame is defined to be constructed from a high strength metallic alloy, and the oil baffle is defined to be constructed from a lower strength lighter weight alloy than the high strength metallic alloy.

* * * * *

UNITED STATES PATENT AND TRADEMARK OFFICE
CERTIFICATE OF CORRECTION

PATENT NO.         : 9,732,839 B2
APPLICATION NO.    : 14/484673
DATED              : August 15, 2017
INVENTOR(S)        : William G. Sheridan Page 1 of 1

It is certified that error appears in the above-identified patent and that said Letters Patent is hereby corrected as shown below:

In the Claims

In Claim 8, Column 6, Line 31; replace "about it respective" with --about its respective--

Signed and Sealed this
Fourth Day of December, 2018

Andrei Iancu
*Director of the United States Patent and Trademark Office*